No. 633,882. Patented Sept. 26, 1899.
L. J. MOISSENET.
PNEUMATICAL APPARATUS FOR APPLYING TOOLS TO SURFACES OF ANY SOLID BODIES.
(Application filed Aug. 17, 1897.)

(No Model.) 5 Sheets—Sheet 1.

WITNESSES:

INVENTOR
Louis Joseph Moissenet

No. 633,882.  
L. J. MOISSENET.  
PNEUMATICAL APPARATUS FOR APPLYING TOOLS TO SURFACES OF ANY SOLID BODIES.  
(Application filed Aug. 17, 1897.)

(No Model.)

Patented Sept. 26, 1899.

5 Sheets—Sheet 2.

WITNESSES

INVENTOR
Louis-Joseph Moissenet

No. 633,882. Patented Sept. 26, 1899.
L. J. MOISSENET.
PNEUMATICAL APPARATUS FOR APPLYING TOOLS TO SURFACES OF ANY SOLID BODIES.
(Application filed Aug. 17, 1897.)
(No Model.) 5 Sheets—Sheet 3.

FIG_3_

WITNESSES. INVENTOR

No. 633,882. Patented Sept. 26, 1899.
L. J. MOISSENET.
PNEUMATICAL APPARATUS FOR APPLYING TOOLS TO SURFACES OF ANY SOLID BODIES.
(Application filed Aug. 17, 1897.)
(No Model.) 5 Sheets—Sheet 4.

WITNESSES.

INVENTOR:

No. 633,882. Patented Sept. 26, 1899.
L. J. MOISSENET.
PNEUMATICAL APPARATUS FOR APPLYING TOOLS TO SURFACES OF ANY SOLID BODIES
(Application filed Aug. 17, 1897.)
(No Model.) 5 Sheets—Sheet 5.
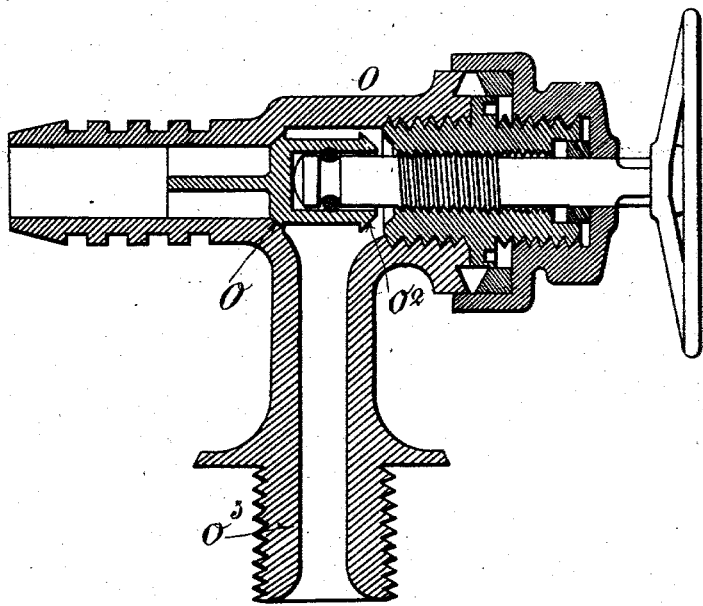

UNITED STATES PATENT OFFICE.

LOUIS JOSEPH MOISSENET, OF CHERBOURG, FRANCE.

PNEUMATICAL APPARATUS FOR APPLYING TOOLS TO SURFACES OF ANY SOLID BODIES.

SPECIFICATION forming part of Letters Patent No. 633,882, dated September 26, 1899.

Application filed August 17, 1897. Serial No. 648,592. (No model.)

*To all whom it may concern:*

Be it known that I, LOUIS JOSEPH MOISSENET, naval engineer, of Cherbourg, in the Republic of France, have invented new Improvements in Pneumatical Apparatus for the Application of Tools to the Surface of any Solid Body, (for which I have obtained Letters Patent of France for fifteen years, No. 263,168, dated January 18, 1897;) and I do hereby declare that the following is a full and exact description thereof, reference being made to the accompanying drawings.

My invention has for its object a means of applying or affixing tools to the surface of any solid body, and which consists in making use of adherence, as created by a vacuum, by means of one or more suckers of proper size placed on the said surface and in the interior of which a more or less complete vacuum is made, so as to establish on the surface of the solid body fastening-points which allow of fixing in place any sort of machine-tool, such as drills, mortising-machines, and the like.

In the accompanying drawings I have shown an apparatus for putting my invention in practice in which a vacuum is produced in the interior of the suckers by putting them in communication, when brought to the places where they are to stick, with a vessel of large volume in which a vacuum has previously been made. The said suckers serve to firmly fix a bench or stay on the surface to be operated upon, and the tool is fitted to the said bench, which serves as its fixed point of support during the work.

Figure 1:
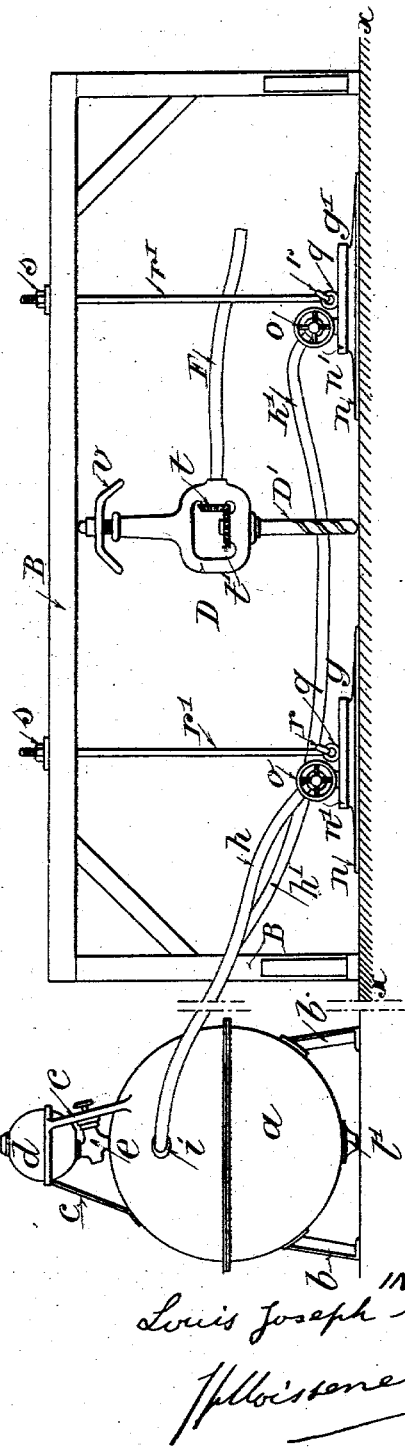
Figure 2:
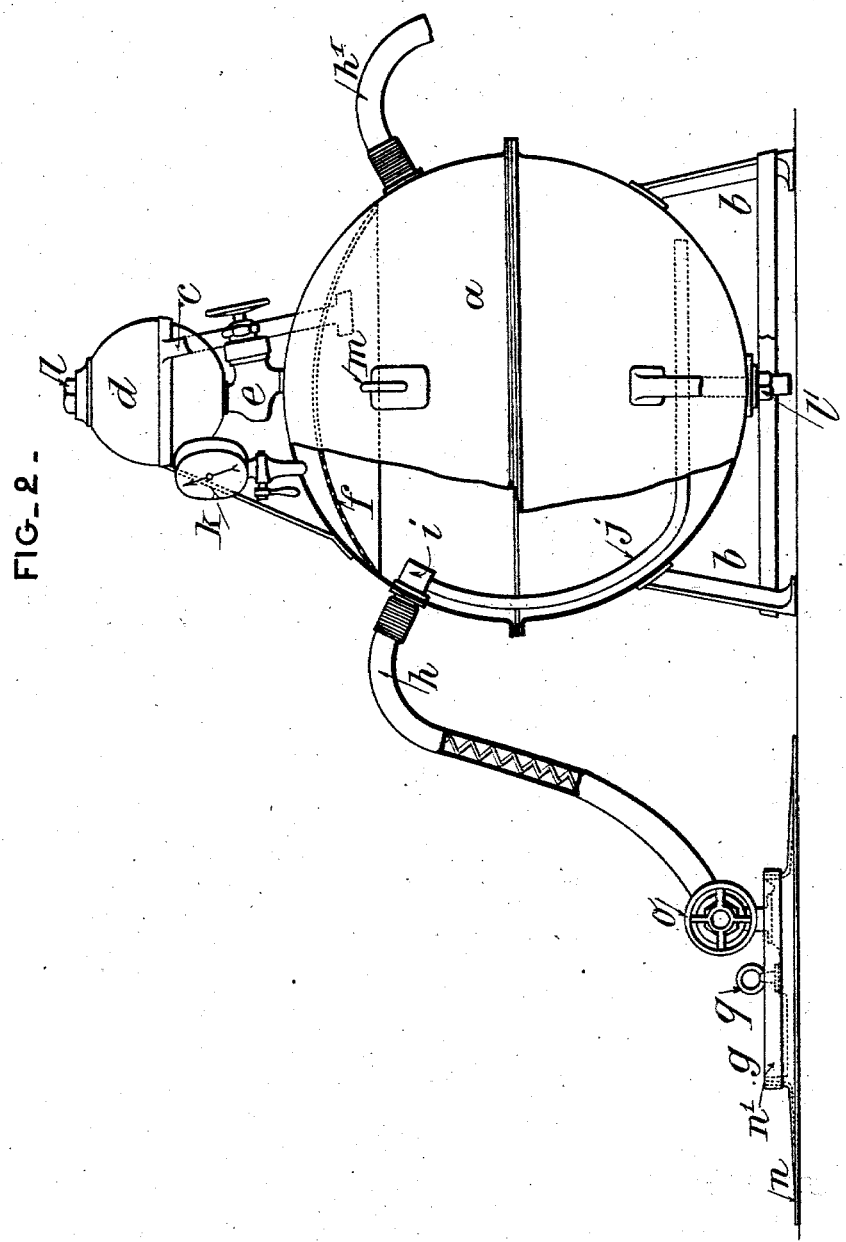
Figure 3:
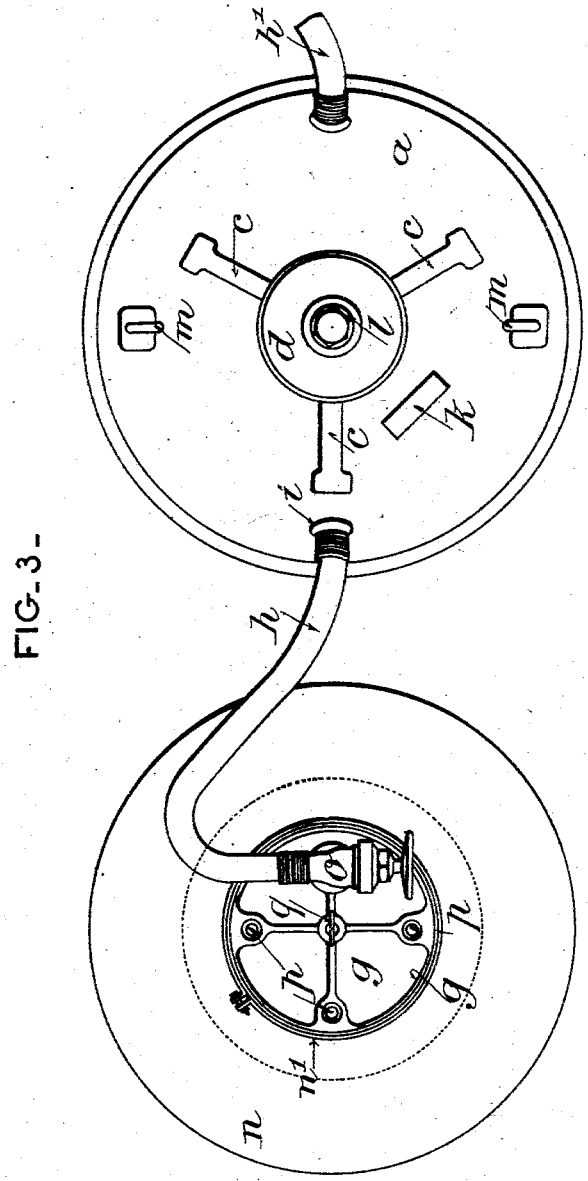
Figure 4:
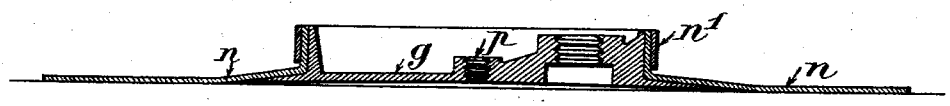
Figure 5:
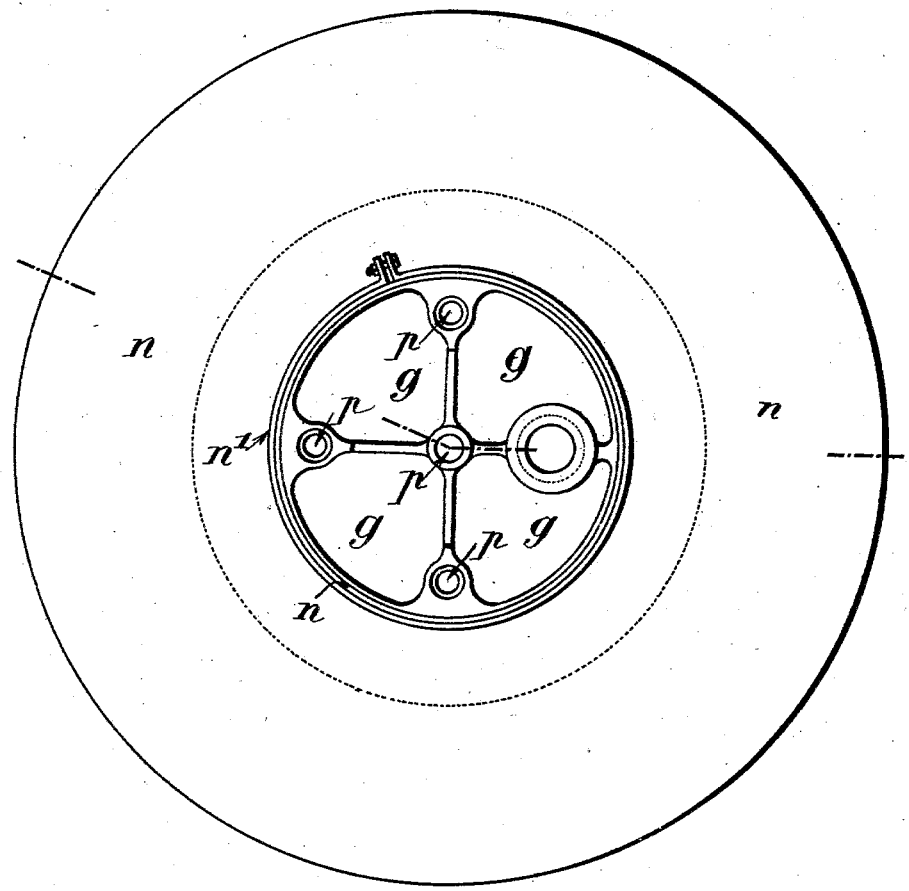

In the accompanying drawings, Figure 1 is a general view of how the apparatus is fitted up. Figs. 2 and 3 represent, respectively, a sectional elevation and a plan of the pneumatical apparatus or vacuum vessel connected to a sucker. Figs. 4 and 5 represent the details of a sucker in section and in plan, and Fig. 6 is a section of the sucker-cock by which can be interrupted or established the communication between the interior of the said sucker and the vacuum vessel.

The pneumatical apparatus comprises, essentially, a vacuum vessel $a$ of spherical shape and fixed on a support $b$. Above the said vacuum vessel is firmly fixed, by means of a three-legged stand $c$, a sphere $d$, to be filled with cold water. A cock $e$ establishes communication between the sphere $d$ and the vessel $a$. A perforated diaphragm $f$ is fixed in the interior of the vacuum vessel $a$ and adjacent to the top, so that the water issuing from the sphere $d$ when the cock $e$ is open falls onto the said diaphragm and is distributed in place in the interior of vacuum vessel $a$, whereby a rapid condensation of the steam is determined.

The vessel $a$ is connected to each of the suckers $g$ $g'$ by flexible tubes $h$ $h'$, of rubber, strengthened, for instance, by a spiral spring. From the pipe $i$, to which is connected the tube $h$, branches out in the interior of the vessel $a$ a pipe $j$, through which the steam comes into the said vessel. The apparatus comprises a steam-gage $k$, a cock $l$ for the admission of the water into the sphere $d$, a cock $l'$ for letting off the water from the vessel $a$, and handles $m$ $m$ for carrying the said vessel.

Each sucker comprises a body part $g$ or $g'$, a leather ring $n$, a collar $n'$ to clamp the leather ring, and a cock $o$, putting at the proper time the under part of the sucker in communication with the vacuum vessel $a$. In the thickness of the body part of the sucker are provided blind holes $p$ $p$, screw-threaded for the purpose of fixing directly the frame of the machine-tool, or a stay on which the said machine-tool may be supported, or simply fastening-brackets.

In the drawings, Fig. 1 shows that in the central hole $p$ of each sucker is screwed a fastening-bracket $q$. In the eye or opening of the said bracket is passed a hook $r$, having a screw-threaded stem $r'$, screwed into a bench or stay B. Nuts $s$ allow of having sufficient pull on the suckers and of firmly fixing the bench B on the surface $x$ $x$ to be operated upon.

Under the bench B is placed the tool-carrier D, which, as here shown, is a drill-carrier. The tool is turned by the flexible connection F and the beveled pinions $t$ $t'$, the said tool being constantly pressed against the surface to be perforated by the operating handled screw $v$, which takes its support on the bench or stay B.

On each sucker is screwed a cock $o$, on which is fixed one of the ends of the flexible pipe $h$ or $h'$, having a stay inside. A special feature of the said cock $o$ (shown in detail in Fig. 6) is the arrangement of its double-seated valve $o'$ $o^2$. Care is taken in opening the said cock to unscrew it bodily in the proper direction in order to cause the counter-seat $o^2$ to move back to prevent any air coming in around the operating-stem.

To prepare the apparatus for operating—say for making perforations in the wall $x$ $x$, Fig. 1—the process is as follows: The nipple $o^3$ of one of the cocks $o$, previously screwed into its corresponding sucker is connected to any suitable source of steam in interposing, if desired, a steam expanding device with safety-valve. The cock $o$ of the other sucker is opened, as well as the cocks $l$ and $l'$ of the pneumatical apparatus and the communication-cock $e$. Then steam is allowed to enter until no more water passes out at $l'$. The cock $l'$ is put in place, steam is again allowed to enter for a moment, all the cocks are closed, and the nozzle $o^3$ is removed from the source of steam. The sphere $d$ is filled with cold water, then corked down, and the cock $e$ is opened. Water flows into the vessel $a$, condensation is brought about in a few moments, and a vacuum is obtained up to about one kilo per square centimeter. The apparatus is then brought near the surface to be operated upon and on which fastening or fixing points may be taken. If the apparatus is to be moved, rods or bars are passed through the handles $m$ $m$ and the apparatus is brought to the proper place. The under side of the suckers is made fairly clean, as well as the surface which is to receive them. Each sucker is applied, and lard or any other pasty substance is put around the edge of the leather $n$ and on the surface where the said leather is to be fixed. The cocks $o$ are then opened by unscrewing them bodily, and the result is adherence. It only remains to hook the rods $r$ onto the suckers and to suitably tighten the nuts $s$ in order to fix the bench B to the surface $x$ $x$. The tool-carrier is fitted on the said bench and the operation may be proceeded with. To take a sucker off, the corresponding cock $o$ is closed and then the sucker is removed by hand or by means of some pointed tool pried under the edge of the leather $n$. The apparatus can operate a great number of times without having to make a vacuum again in the vessel $a$.

To make holes—in sheet metal, for instance—with the tool-carrier D, operated by a flexible connection, one can, without having to produce a fresh vacuum in the vessel $a$, bore numerous holes in several sheets of metal more or less distant from each other.

During the whole of the time the work is being done the cocks $o$ are open and the suckers are in communication with the vacuum vessel $a$. The size of the latter is such as not to allow air which passes through the pores of the sucker-fittings to rapidly increase the pressure, so that a sufficient vacuum is maintained for a long time under the said suckers and that the fitting parts of the latter remain firmly stuck on the surface to be operated upon.

It is evident that I can make suckers adhere to plane surfaces arranged in any direction—to vertical or oblique walls, to the under surfaces of ceilings, and the like.

I mention, in conclusion, that the machine-tool employed and which it is required to apply or affix may be of any sort and that the surface to be operated upon may be of metal or of any other resisting material.

I claim—

1. A frame B, to serve as a support for a tool, having rigid legs provided with laterally-extended rigid bases adapted for contact with the material to be operated upon, and connected by cross-bars $r'$ to suckers $g$, the suckers being flexibly connected to said cross-bars, the said suckers being put in communication, by means of flexible pipes $h$, provided with cocks $o$, with a vacuum vessel $a$, substantially as hereinbefore described, and for the purpose specified.

2. A frame B, to serve as a support for a tool, having rigid legs provided with laterally-extended rigid bases adapted for contact with the material to be operated upon, and connected by cross-bars $r'$ to suckers $g$, the suckers being flexibly connected to said cross-bars in which a vacuum is made.

3. The combination, with a tool-carrying frame B, having rigid legs provided with laterally-extended rigid bases, of suckers $g$, having a body the outer edge or rim of which is beveled to be applied direct to the surface to be operated upon, and leather $n$, or other similar material, extending over the outer face of the said rim or edge of the sucker and over the surface to be operated upon, the said suckers being flexibly connected to cross-bars $r'$ which are in turn connected to the supporting-frame B, and by flexible pipes $h$, provided with cocks $o$, to a vacuum vessel $a$, as hereinbefore described, and for the purpose specified.

4. The combination, with the tool-support having rigid legs provided with laterally-extended rigid bases, of suckers $g$, having a body the outer edge or rim of which is beveled to be applied direct to the surface to be operated upon, and leather $n$, or other similar material, extending over the outer face of the said rim of the exhausting-cup and over the surface to be operated upon, the said suckers being flexibly connected to cross-bars $r'$ which are in turn connected to the support for the tool, a vacuum being capable of being made in the said suckers.

5. The combination, with a frame B having rigid legs provided with laterally-extended rigid bases and adapted to serve as a support for a tool and suckers $g$, connected to the said frame B by cross-bars $r'$ flexibly connected to said suckers, of the flexible pipes $h$, provided with cocks $o$, to put the interior of the movable suckers in communication with a stationary vacuum vessel $a$, substantially as hereinbefore described, and for the purpose specified.

6. The combination of the tool-support having rigid legs provided with laterally-extended rigid bases, cross-bars carried by said tool-support, suckers flexibly connected to the ends of the cross-bars, and pipes for exhausting the air from the suckers, substantially as described.

In witness whereof I have hereunto set my hand in presence of two witnesses.

LOUIS JOSEPH MOISSENET.

Witnesses:
O. DUEHER,
P. AVRY.